(12) United States Patent
Yasuda et al.

(10) Patent No.: US 9,287,809 B2
(45) Date of Patent: Mar. 15, 2016

(54) INVERTER FOR A DRIVING A MOTOR

(71) Applicant: TRIGENCE SEMICONDUCTOR, INC., Tokyo (JP)

(72) Inventors: Akira Yasuda, Nishitokyo (JP); Jun-ichi Okamura, Kawasaki (JP)

(73) Assignee: TRIGENCE SEMICONDUCTOR, INC., Tokyo (JP)

( * ) Notice: Subject to any disclaimer, the term of this patent is extended or adjusted under 35 U.S.C. 154(b) by 217 days.

(21) Appl. No.: 14/041,321

(22) Filed: Sep. 30, 2013

(65) Prior Publication Data

US 2014/0028227 A1 Jan. 30, 2014

Related U.S. Application Data

(63) Continuation of application No. PCT/JP2012/057626, filed on Mar. 23, 2012.

(30) Foreign Application Priority Data

Mar. 31, 2011 (JP) ................................ 2011-080557

(51) Int. Cl.
*H02P 27/06* (2006.01)
*H02M 7/493* (2007.01)
*H02P 6/00* (2006.01)
*H02M 7/5387* (2007.01)

(52) U.S. Cl.
CPC ........... *H02P 6/002* (2013.01); *H02M 7/5387* (2013.01); *H02P 27/06* (2013.01)

(58) Field of Classification Search
CPC ....................................................... H02P 7/29
USPC ........... 318/400.17, 400.2, 400.26, 800, 801, 318/807
See application file for complete search history.

(56) References Cited

U.S. PATENT DOCUMENTS

| | | | | |
|---|---|---|---|---|
| 3,940,669 A | * | 2/1976 | Tsuboi et al. | 318/721 |
| 4,942,511 A | * | 7/1990 | Lipo et al. | 363/136 |
| 5,270,633 A | * | 12/1993 | Dijkmans | 318/810 |
| 5,959,855 A | * | 9/1999 | Ishii et al. | 363/95 |
| 6,101,109 A | * | 8/2000 | Duba | H02M 7/49 363/41 |

(Continued)

FOREIGN PATENT DOCUMENTS

| | | |
|---|---|---|
| EP | 2187657 A1 | 5/2010 |
| JP | H06197593 A | 7/1994 |

(Continued)

OTHER PUBLICATIONS

International Search Report mailed Jun. 26, 2012 in corresponding International Application No. PCT/JP2012/057626.

(Continued)

*Primary Examiner* — Bentsu Ro
(74) *Attorney, Agent, or Firm* — TYPHA IP LLC

(57) ABSTRACT

An inverter for generating a plurality of alternating signals to be supplied to a motor, the motor having a plurality of phases and a plurality of coils arranged at each of the plurality of phases is provided. The inverter is a motor driving inverter characterized in including a multi-level pulse-density modulator configured to modulate a signal that fluctuates periodically and controls rotation of the motor; and a plurality of switching elements configured to generate each of the plurality of alternating signals by controlling an ON/OFF of a direct current according to selection by an output signal of the pulse-density modulator.

6 Claims, 11 Drawing Sheets

(56) References Cited

U.S. PATENT DOCUMENTS

| | | |
|---|---|---|
| 2004/0071003 A1 | 4/2004 | Cocconi |
| 2006/0108957 A1 | 5/2006 | Urakabe et al. |

FOREIGN PATENT DOCUMENTS

| | | |
|---|---|---|
| JP | 06-225527 | 8/1994 |
| JP | 08-242596 | 9/1996 |
| JP | 09-230945 | 9/1997 |
| JP | 2003-530062 | 10/2003 |
| JP | 2004-229488 | 8/2004 |
| JP | 2010-273042 | 12/2010 |
| WO | WO 01/76053 A1 | 10/2001 |

OTHER PUBLICATIONS

International Search Report issued Jun. 26, 2012 in corresponding International Application No. PCT/JP2012/057626.

International Preliminary Report on Patentability issued Oct. 8, 2013 in corresponding International Application No. PCT/JP2012/057626.

Office Action dated Jul. 1, 2015 regarding a corresponding Chinese Patent Application No. 201280010455.0.

Extended European Search Report dated on Oct. 26, 2015 for a corresponding European Patent Application No. EP12765494.5.

Shaoan Dai et al. "Delta-sigma modulation applications in neutral-point clamped inverters", School of Electrical Engineering and Computer Science, Oregon State University, Corvallis, OR.

* cited by examiner

INVERTER FOR A DRIVING A MOTOR

CROSS REFERENCE TO RELATED APPLICATIONS

This application is a U.S. continuation application filed under 35 U.S.C. §111(a), of International application No. PCT/JP2012/057626, filed on Mar. 23, 2012, which claims priority to Japanese Patent Application No. 2011-080557, filed on Mar. 31, 2011, the disclosure of which are incorporated by reference.

BACKGROUND

1. Technical Field

The present invention is related to an inverter for a motor driver. In particular, the present invention is related to an inverter circuit for a motor driver which drives a motor by controlling a direct current using a plurality of bridge connected switching elements using a digital signal.

2. Description of Related Art

Generally, an inverter for a three-phase motor driver drives a motor by converting a direct current to a three-phase alternating signal using six bridge connected switching elements. Here an IGBT (Insulation Gate type Bipolar Transistor), or MOSFET, etc. are generally used as such a switching element.

A typically known example of a current power supply (100), an inverter circuit (101) comprised by six bridge connected switching elements, and a three-phase motor (104) driven by a three-phase alternating signal (103) generated by the inverter circuit is shown in FIG. 1.

Generally, a PWM (pulse-width modulation) signal is used for controlling a switching element and an alternating signal is output by a switch operation of the switching element according to the PWM signal. In the case of a three-phase motor, the rotation of the motor is controlled by supplying three-phase alternating signals obtained from six groups of switching elements to a motor. Specifically, it is possible to control the number of rotations and torque of a motor by controlling the amplitude voltage and the frequency of a three-phase alternating signal output from an inverter circuit using a PWM signal.

The principle for obtaining a three-phase alternating signal of a voltage amplitude variable using an inverter circuit according to a PWM signal is explained below using FIG. 2. A triangular wave of a reference signal (201) and input voltages (202*a*~202*c*) of since waves each phase-shifted by a 120 degree phase are compared using a voltage comparator. Signals (203*a*~203*c*) U, V and W from the voltage comparator each become a PWM signal according to the input voltages (202*a*~202*c*) of the since waves. That is, the pulse width of a PWM signal changes due to a change in the amplitude of the sine wave input voltages (202*a*~202*c*), and the amplitude voltage of an alternating signal output by the inverter circuit changes due to a change in the ON/OFF ratio of a switching element controlled by the PWM signal.

In addition, if the frequency of the sine wave input voltages the (202*a*~202*c*) is changed, the pulse density of the PWM signal changes and the frequency of an alternating signal output by the inverter circuit changes due to a change in the ON/OFF frequency of a switching element controlled by the PWM signal.

Since the amount of current that can be controlled by one switching decreases because the switching frequency of an ON/OFF of a switching element increases when the frequency of a triangular wave of a reference signal is increased, it becomes possible to control a current ripple of an alternating signal caused by switching and a magnetic noise of a motor.

With regard to the above mentioned background, there are literatures such as Japanese Patent Laid Open H06-225527 and Japanese Patent Laid Open 2003-530062.

However, a problem arises when such that overall efficiency of the switching elements decreases when the current consumed by the switching elements themselves increases due to an increase in the ON/OFF switching frequency of the switching element.

As described above, the switching elements and a control method of the switching elements are important main components in an inverter circuit for a motor driver from the viewpoint of functionality, efficiency, and cost. In an inverter circuit for a motor driver, making both functionality and cost compatible without losing overall efficiency has become an important technological issue.

Generally, there are three means for providing a switching element with small scale and high efficiency: (1) decreasing the current value for switching the switching element ON/OFF, (2) reducing the ON voltage, and (3) reducing the switching time.

(1) If the voltage level of a direct current power source input to an inverter is increased, the voltage level required for obtaining the same rate of power within the motor drops and therefore it is possible to reduce the current value of the current which the switching element uses to perform ON/OFF. However, because the voltage applied to a switching element increases and the amplitude value of an alternating signal output by an inverter circuit increases, it becomes necessary to increase the insulation resistance between the switching element, the inverter circuit and between coils within the motor. Increasing insulation resistance leads to increases in scale of the inverter circuit and motor device. In addition, because a high voltage current potential becomes necessary for inputting to the inverter circuit, if a booster circuit is introduced before the inverter, this may lead to a significant increase in the cost of the device, which is a problem.

(2) An ON voltage of the switching element is basically determined by the physical characteristics of a switching element. For example, in the case where the switching voltage is 200V or less, it becomes possible to use a MOSFET with a comparatively low ON voltage as a switching element instead of an IGBT. Generally, when the switching voltage of a solid electronic device such as an IGBT or MOSFET is increased, the ON voltage increases. Therefore, it is effective to reduce the switching voltage as much as possible in order to reduce the scale of a switching element.

(3) In order to reduce the switching time of an inverter circuit, it is necessary to increase the transition speed of a PWM signal input to the inverter circuit. In order to increase the transition speed of a PWM signal connected to the gate of a switching element, it is necessary to reduce the gate capacitance of the switching element serving as a load or increase the driving capability of the PWM signal. Generally, the gate capacitance increases when the strength to voltage of a switching element increases. When the gate capacitance increases a problem occurs whereby the current consumed by a switching element itself increases leading to an overall decrease in efficiency. Therefore, it is effective to reduce the switching voltage as much as possible in order to maximize the efficiency of a switching element.

As described above, reducing the size of the switching device is effective by reducing the switching voltage. On the other hand, when the switching voltage is decreased, the current required for driving a motor increases and therefore it becomes necessary to increase the capacitance of the switching element (the number of switching elements), and a small scale and high efficiency inverter circuit for driving a motor cannot be obtained.

In FIG. 1, an example is shown using the PWM signal obtained by comparing a reference triangular wave and an input sine wave signal using a voltage comparator as a control signal of the switching element of an inverter circuit for driving a motor. However, instead of a PWM signal it is also possible to control the switching element by the signal obtained using the input sine wave signal as a pulse density modulation (PDM) using a one-bit delta-sigma modulator. In Japanese Patent Laid Open H06-225527, an example is shown of driving a single phase inductive motor using a signal obtained by modulating the input sine wave signal as a control signal of the switching element using a primary one-bit delta-sigma modulator. In Japanese Patent Laid Open 2003-530062, an example is shown of controlling a switching element of a resonance type switching power supply using the PDM signal from a delta-sigma converter.

However, even in the case where a switching element is controlled using a signal obtained by the PDM, although it is effective to reduce the size of the switching element by reducing the switching voltage, the current required for driving a motor increases when the switching voltage is decreased and therefore, it becomes necessary to increase the capacitance of the switching element (number of switching elements), and a small scale and high efficiency inverter circuit for driving a motor is not possible which does serve to solve this conflicting problem.

As has been explained above, reducing the switching voltage is effective in order to reduce cost without compromising efficiency and the functions required in the inverter circuit for driving a motor. However, the problem exists of not being able to reduce the size of a switching element due to an increase in the current required for driving a motor when the switching voltage is decreased, or the problem of requiring an increase in the capacitance of a switching element (the number of the switching elements) in order to obtain the current required for driving a motor when the switching voltage is decreased leading to an increase in the current consumed by the switching element itself and a drop in overall efficiency.

SUMMARY

An inverter for generating a plurality of alternating signals to be supplied to a motor, the motor having a plurality of phases and a plurality of coils arranged at each of the plurality of phases, is provided as one embodiment of the present invention. The inverter has a characteristic in which the inverter includes a multi-level pulse-density modulator configured to modulate a signal that fluctuates periodically and controls rotation of the motor; and a plurality of switching elements configured to generate each of the plurality of alternating signals by controlling an ON/OFF of a direct current according to selection by an output signal of the pulse-density modulator In addition, an operating method of an inverter generating a plurality of alternating signals to be supplied to a motor, the motor including a plurality of phases and a plurality of coils arranged at each of the plurality of phases, is provides. The method is characterized in which the method includes modulating a signal that fluctuates periodically and controls rotation of the motor by a pulse-density modulator and generating an output signal; and selecting each of a plurality of switching elements according to the output signal and generating each of the plurality of alternating signals and controlling an ON/OFF of a direct current.

DESCRIPTION OF EMBODIMENTS

The best mode for carrying out the present invention is described below with reference to the accompanying drawings. Furthermore, the present invention may be performed by adding various modifications without departing from the gist of the present invention and without being limited to the following explanation of the present invention.

First Embodiment

Figure 3:
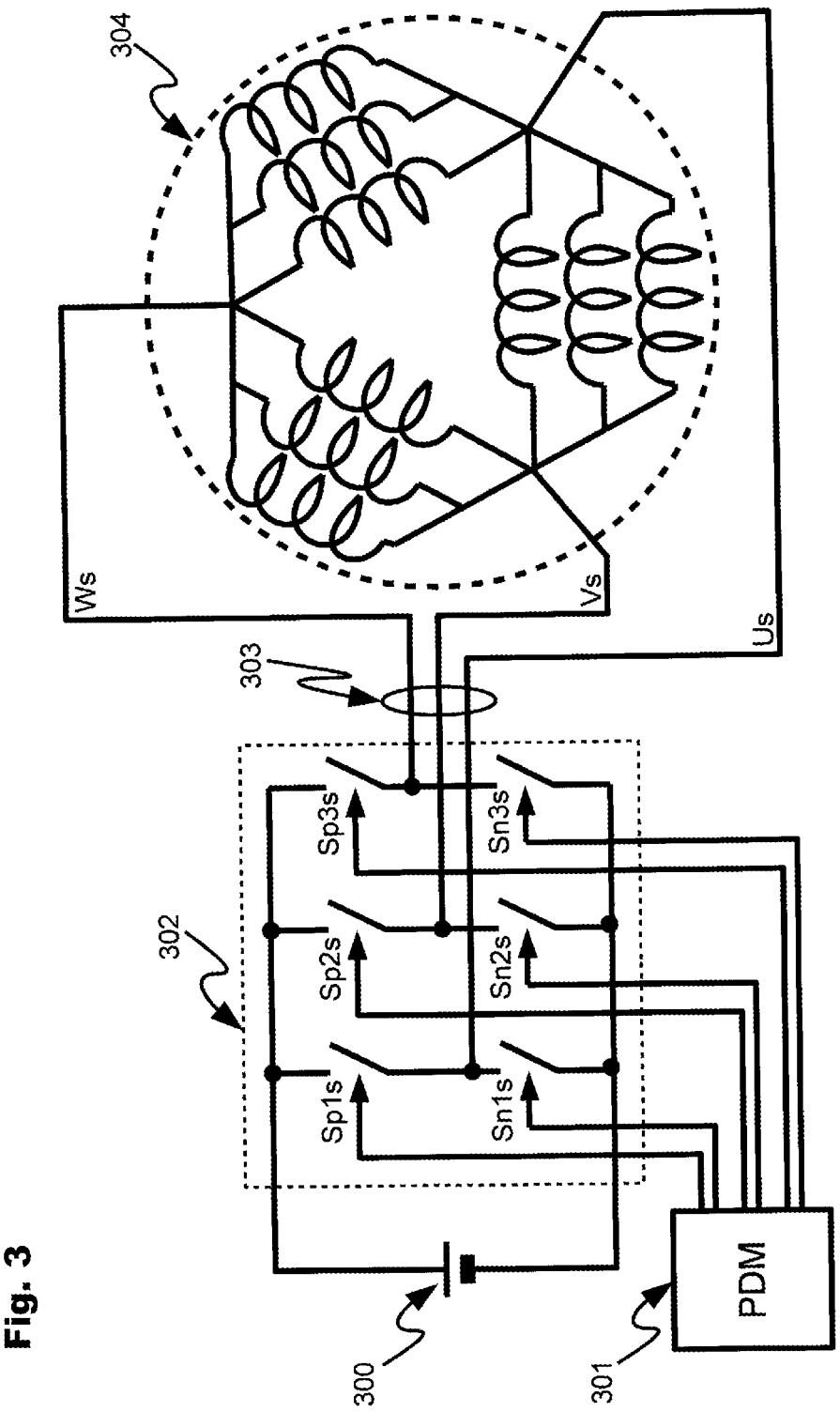
FIG. 3 is a circuit diagram of a motor system related to a first embodiment of the present invention.

FIG. 3 shows a circuit diagram of a motor system related to the first embodiment of the present invention. The motor system related to the present embodiment includes an inverter circuit for a three-phase motor. The present embodiment includes a direct current power supply (300), a multilevel delta-sigma modulation circuit (301) for generating a plurality of PDM signals, an inverter circuit (302) formed by a plurality of bridge-connected switching elements, and a three-phase motor (304) having a plurality of coils which are supplied with a plurality of three-phase alternating signals generated by the inverter circuit. Furthermore, it is also possible to generalize this configuration by using the delta-sigma modulation circuit as a pulse density modulation circuit. Hereinafter, an embodiment using a delta-sigma modulation circuit as a pulse density modulation circuit in order to simplify the description is explained. In addition, it is possible to use an oversampling modulator instead of the delta-sigma modulation circuit.

In particular, the plurality of coils is arranged in each phase to form the three-phase motor. That is, one feature of the present invention is that it is formed from a three-phase motor (304) having a plurality of coils supplied with the plurality of three-phase alternating signals (303). It is possible to control the driving capability of the motor by controlling the number of the plurality of coils provided with the plurality of alternating signals instead of controlling the driving capability of the motor using the voltage of the alternating signal as is conventionally performed. That is, in the present embodiment the number of driving coils of motor is increased instead of decreasing the driving voltage of the motor. When the number of driving coils of the motor is denoted as N, and the current flowing through the driving coil of the motor is denoted as I with the driving power denoted as V, the power is N×I×V. That is, if the power is the same, it is possible to reduce the driving voltage to 1/N of the voltage required to obtain the same power using a motor with one coil.

Figure 1:
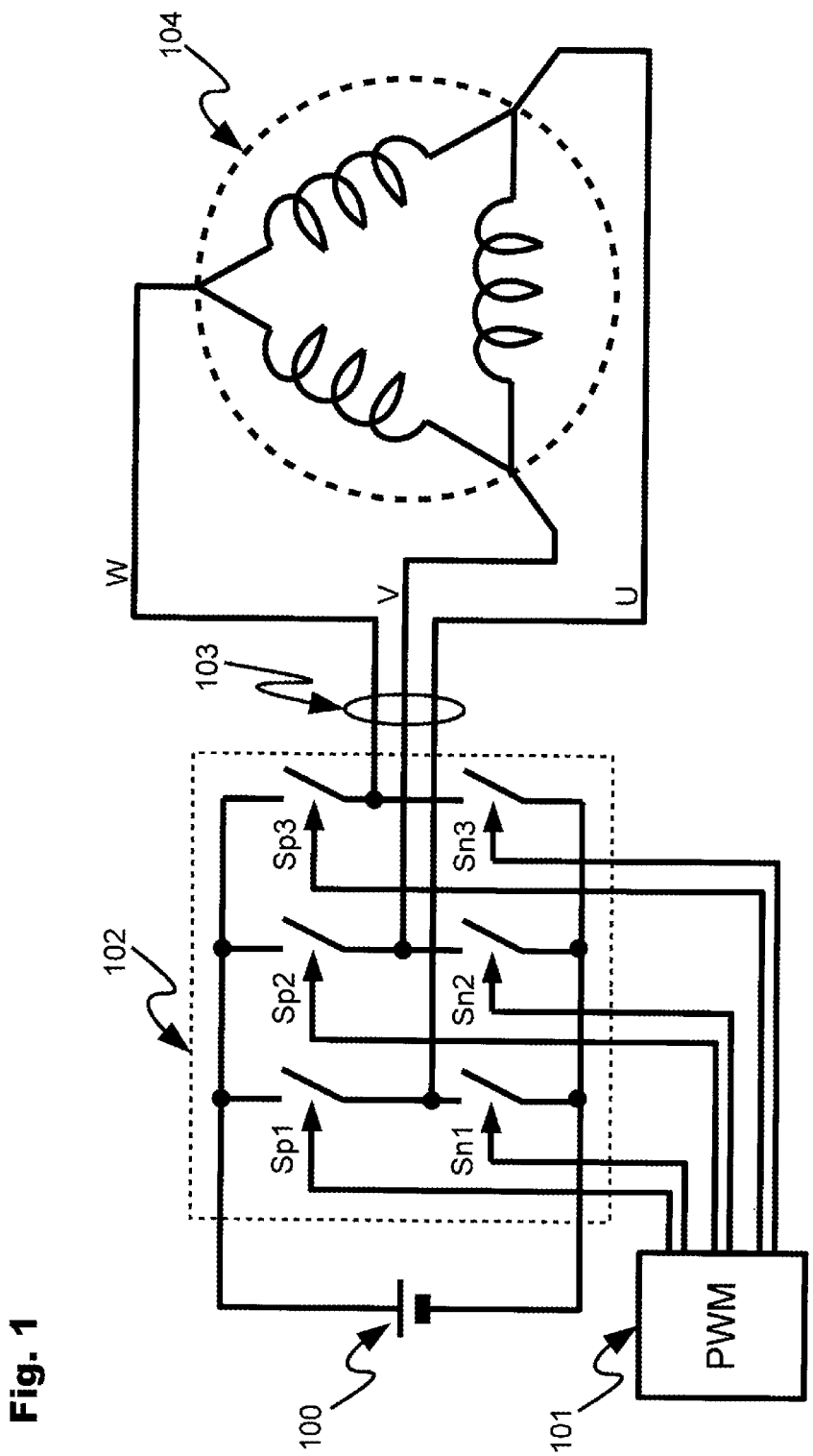
FIG. 1 is a conventional example of a three-phase inverter circuit for a motor.
Figure 2:
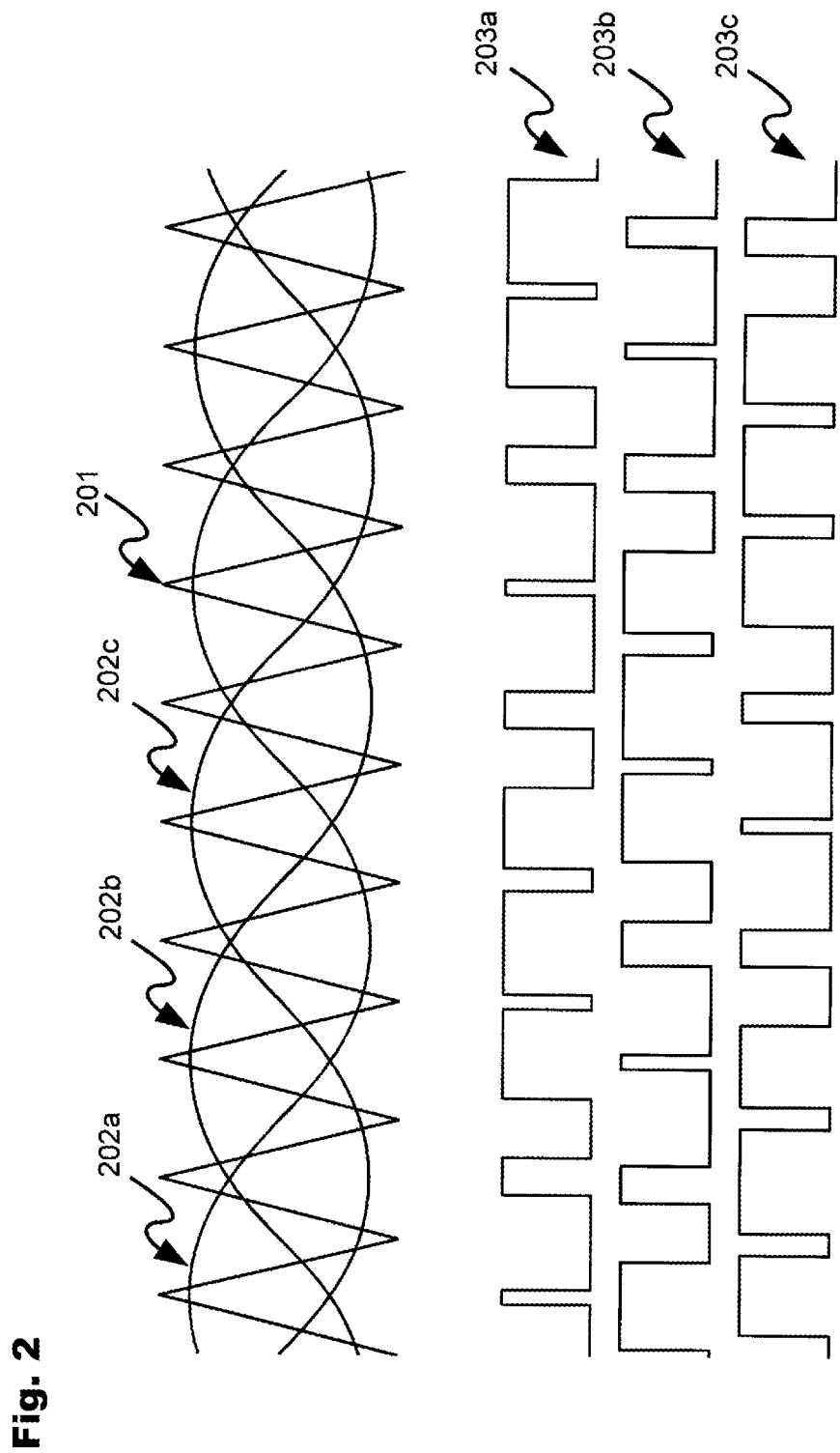
FIG. 2 is a diagram showing the operation principle of PWM control of a conventional example of a three-phase inverter circuit for a motor.

A signal for controlling the rotation of the motor (304) which varies periodically is supplied to the multi-level delta-sigma modulation circuit (301). For example, a comparison result by the comparator of the triangular wave shown in FIG. 2, with each of a plurality of sine waves having different phases respectively is input to the multi-level delta-sigma modulation circuit of (301).

Figure 4A:
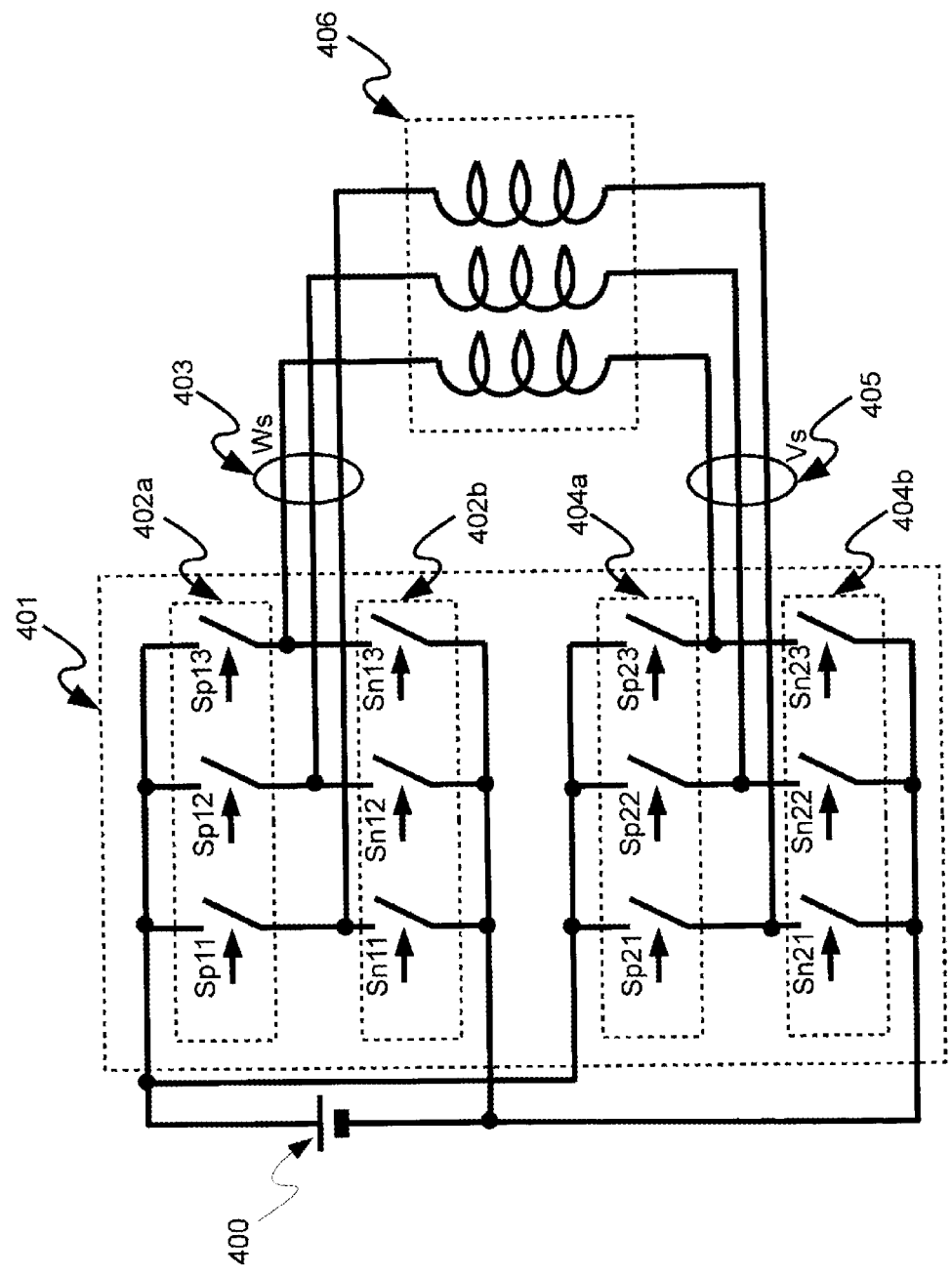
FIG. 4a is a detailed circuit diagram of a three-phase inverter circuit for a motor of a motor system related to the first embodiment of the present invention.

An inverter circuit (401) formed from a plurality bridge-connected switching elements (402a, 402b, 404a, 404b), a plurality of alternating signals (403, 405) generated by the inverter circuit (401) and a connection relationship between the plurality of coils (406) within the motor are shown in more detail In FIG. 4a. The plurality of switching elements (402a, 402b, 404a, 404b) is switch operated by a plurality of PDM signals generated by the multi-level delta-sigma modulation circuit. Although the inverter circuit required for obtaining one of phase alternating signals of the three-phase alternating signals is shown in FIG. 4a, the remaining two-phase signals are also generated by similar circuits.

Figure 4B:
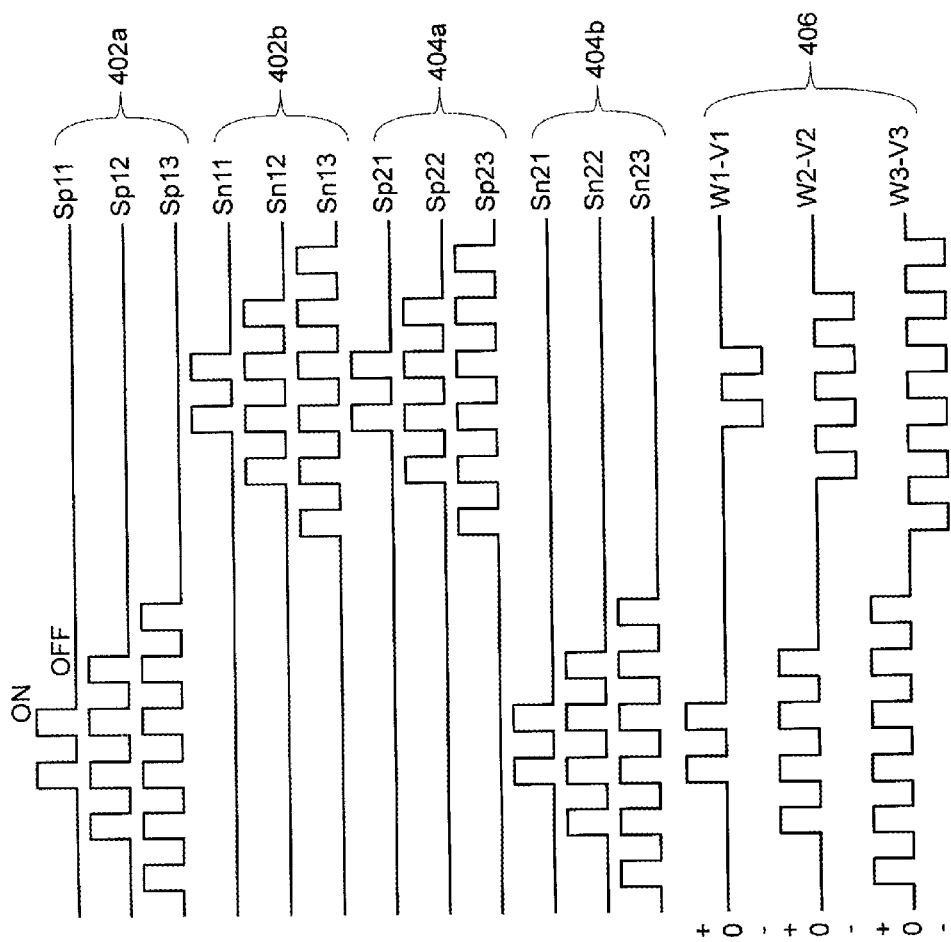
FIG. 4b is a diagram showing the operation principle of PWM control of a three-phase inverter circuit for a motor of a motor system related to the first embodiment of the present invention.

The wave forms of a plurality of PDM signals which control switching elements (402a, 402b, 404a, 404b) and a current signal which flows to the plurality of coils (406) supplied with the plurality of alternating signals (403, 405) is shown in FIG. 4b.

As is clear from FIG. 4b, when the voltage of an alternating signal is high, a current flows to all of the three coils (406) and when the voltage of the alternating signal is low, a current only flows to only one coil. In this way, it is possible to reduce a driving voltage for driving a motor by controlling an alternating signal according to the power for driving the motor. In addition, because the number of switching elements supplied with a PDM signal changes according to the power for driving a motor, the current consumed by the switching element itself decreases and it is possible to increase the efficiency of the inverter circuit for driving a motor.

As described above, it is possible to reduce a driving voltage for driving a motor using the inverter circuit of the motor system related to the present embodiment in the three-phase motor (304) having the plurality of coils supplied with a plurality of three-phase alternating signals (303).

Second Embodiment

On the other hand, another problem arises when the physical arrangement position of a plurality of coils disposed within the motor is different between the coils. When the physical arrangement position of a coil is different, the physical positional relationship with the rotor magnet of a motor with respect to the position of coil becomes different for each coil and as a result a new problem arises whereby the motor drive power of each of the plurality of coils is different.

That is, when the motor driving power of each of the plurality of coils is different, unevenness is generated in the driving capability of the motor, the problem of magnetic noise in the motor and motor mechanical vibration occurs. Therefore, to avoid this problem, a plurality of uniform PDM signals is generated by a signal selection filter circuit using the plurality of PDM signals generated by the multi-level delta-sigma modulation circuit.

Figure 5:
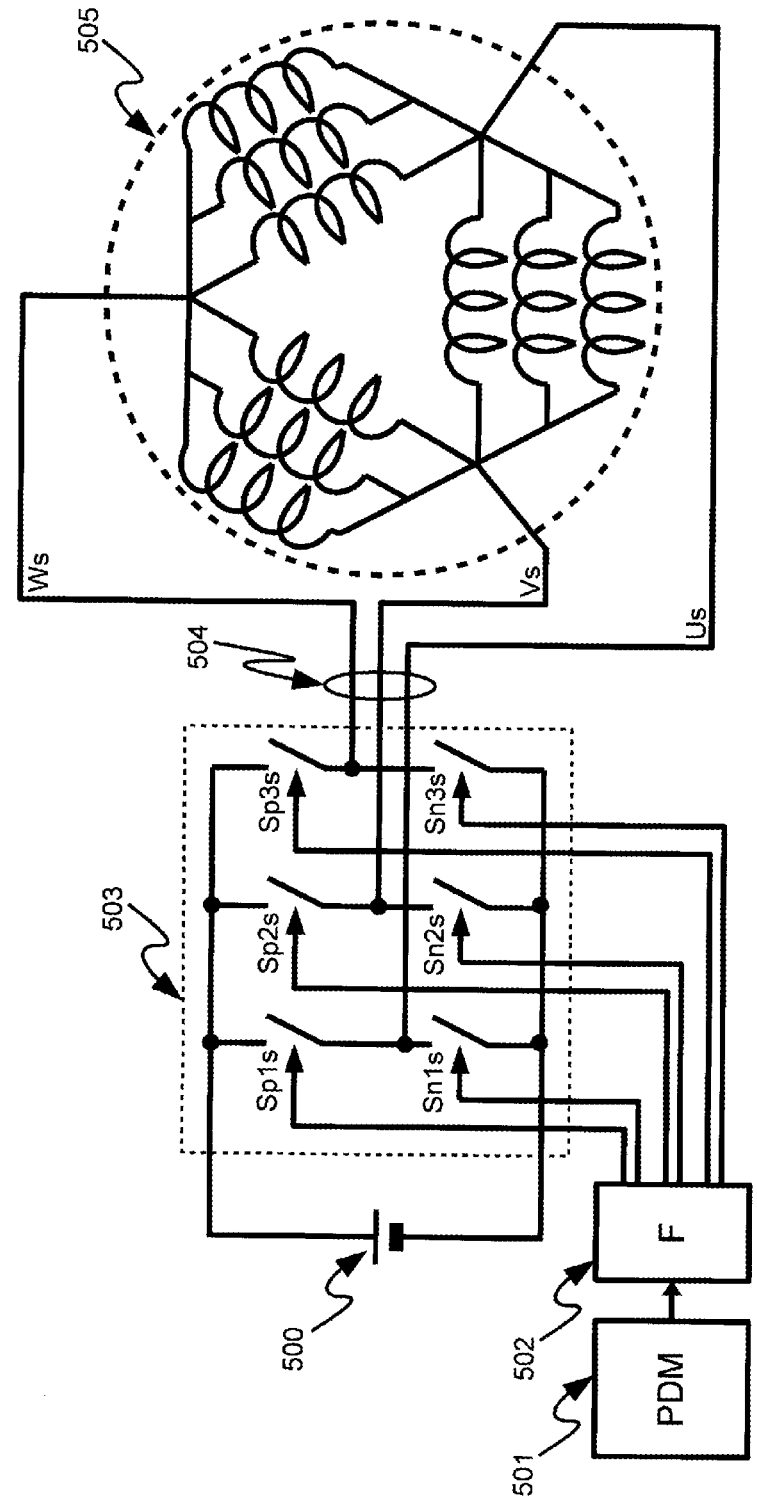
FIG. 5 is a circuit diagram of a three-phase inverter circuit for a motor of a motor system related to a second embodiment of the present invention.

A circuit of a motor system related to a second embodiment of the present invention is shown in FIG. 5. The motor system related to the present embodiment includes a three-phase motor and an inverter circuit for a three-phase motor. In the present embodiment, the present invention is formed from a direct current power supply (500), a multi-level delta-sigma modulation circuit (501) for generating a plurality of PDM signals, a signal selection filter circuit (502) for making the usage frequency of a switching element uniform, an inverter circuit (503) formed from a plurality of bridge-connected switching elements, and a three-phase motor (505) having a plurality of coils supplied with a plurality of three-phase alternating signal generated by the inverter circuit (503).

Figure 6A:
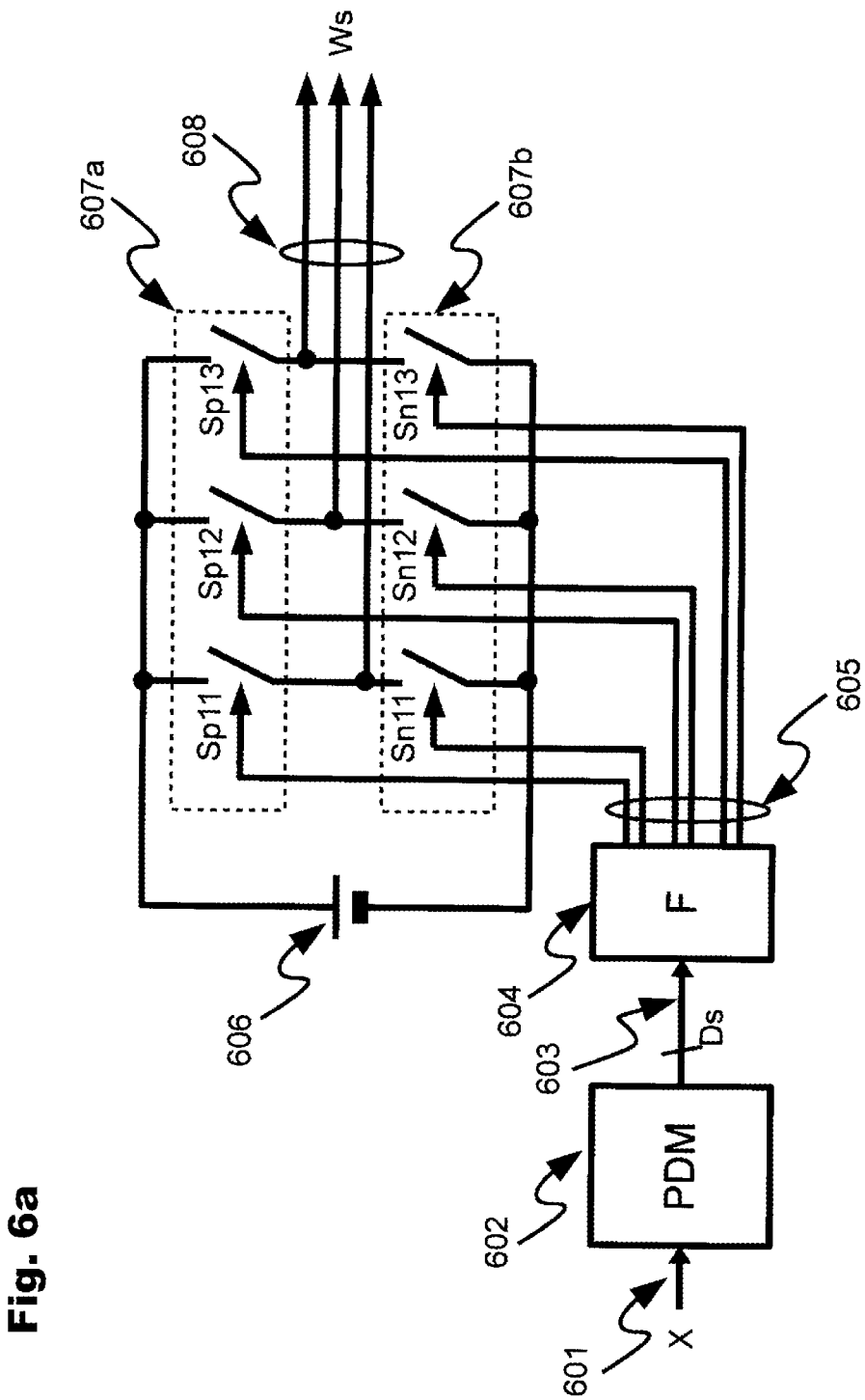
FIG. 6a is a circuit diagram of a three-phase inverter circuit for a motor of a motor system related to the second embodiment of the present invention.

A circuit diagram of the inverter circuit of the motor system related to an embodiment of the present invention is shown in FIG. 6a. The inverter circuit includes a multi-level delta-sigma modulation circuit (602) input with a motor control signal (601) for controlling the rotation of the motor, a signal selection filter circuit (604), a direct current power supply (606), and a plurality of bridge-connected switching elements (607a, 607b) tethered to the direct current power supply (606). The multi-level delta-sigma modulation circuit (602) generates a plurality of PDM signals (603). The PDM signal (605) becomes a signal generated by the selection filter and the frequency with which a switching element is selected is made uniform. A plurality of alternating signals (608) is generated when the plurality of switching elements is selected using the PDM signal (605). Although the inverter circuit required for obtaining one of phase alternating signal of the three-phase alternating signals is shown in FIG. 6a, the remaining two-phase signals are also generated by the same circuit.

One feature of the present embodiment is that the usage frequency of a switching element is controlled by passing the plurality of PDM signals (603) generated from the multi-level delta-sigma modulation circuit (602) through the signal selection filter circuit (604), and generating the plurality of PDM signals (605) filtered so that the switching frequency becomes uniform.

Figure 6B:
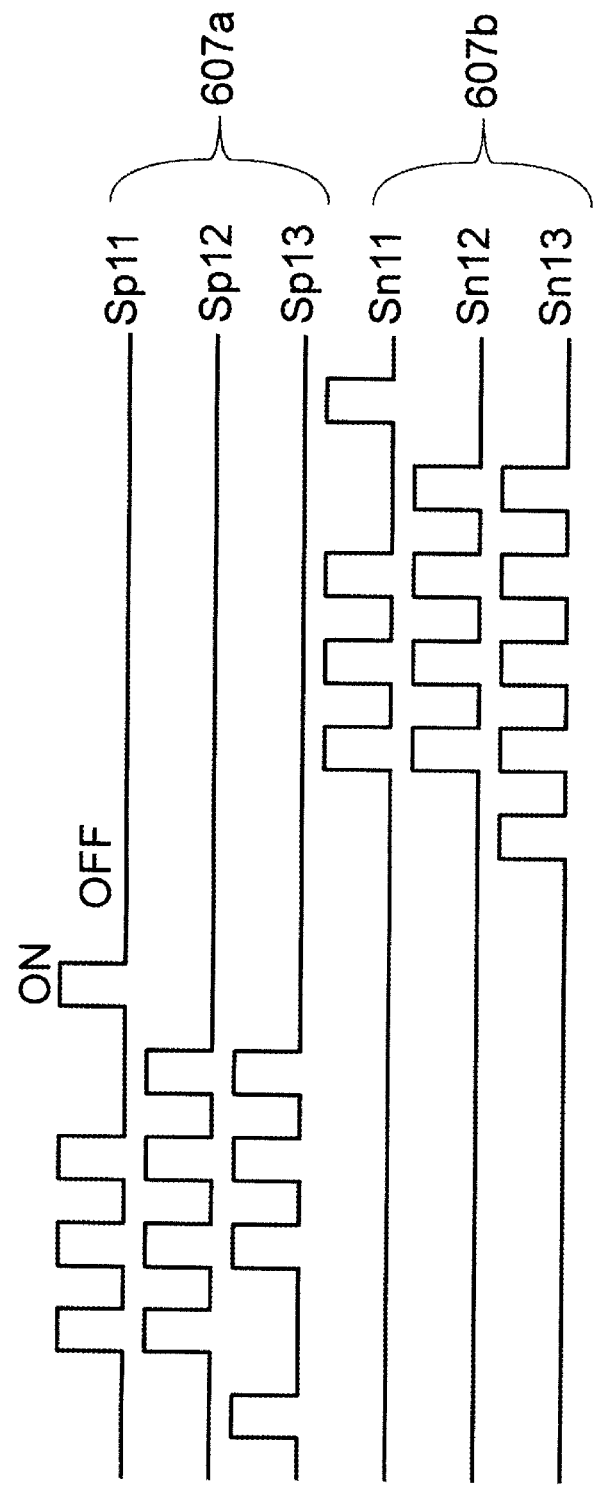
FIG. 6b is a diagram showing the operation principle of PWM control of a three-phase inverter circuit for a motor of a motor system related to the second embodiment of the present invention.
Figure 6C:
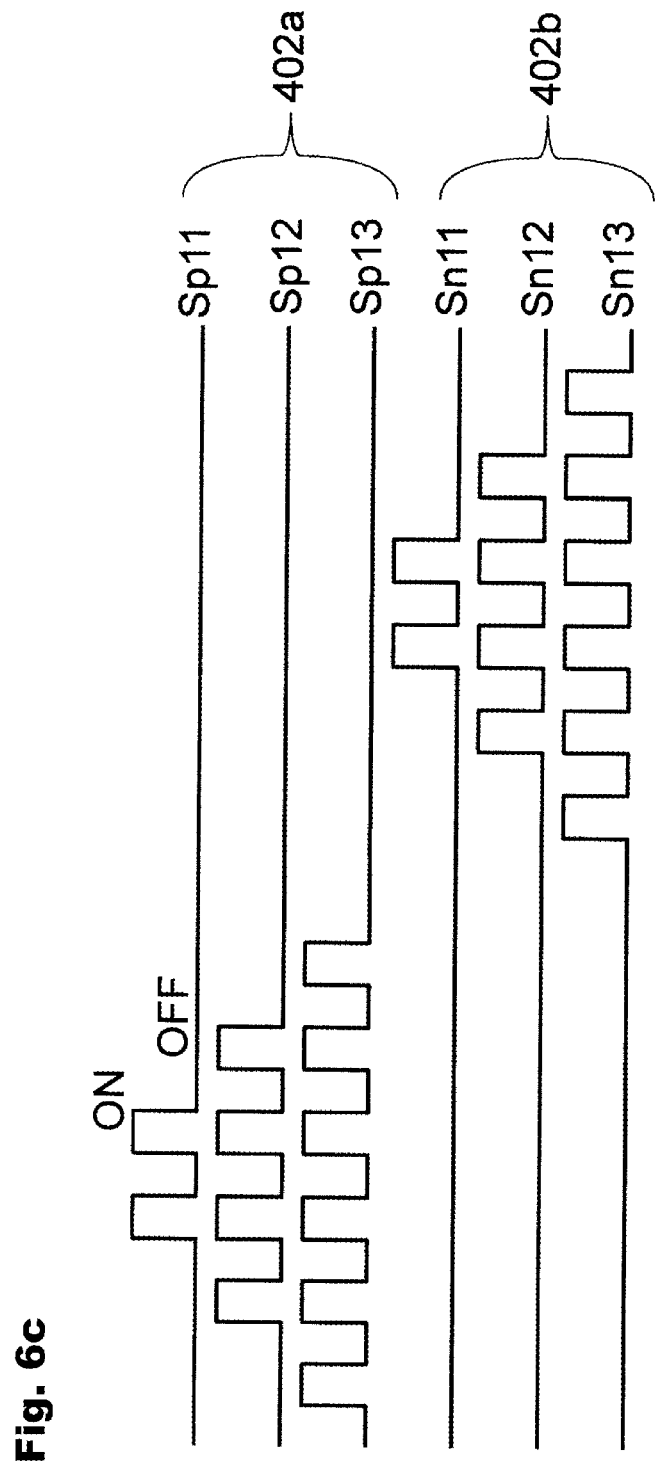
FIG. 6c is a diagram showing the operation principle of PWM control of a three-phase inverter circuit for a motor of a motor system related to the second embodiment of the present invention.

Time variation of the plurality of PDM signals for controlling the switching elements (607a, 607b) and which are filtered by the signal selection filter circuit (604) is shown in FIG. 6b. Time variation of the plurality of PDM signals (503) generated from the multi-level delta-sigma modulation circuit (502) is shown in FIG. 6c. In either case, when the voltage of the alternating signal is high, all of the three switching elements are used. When the voltage of the alternating signal is low, only one switching element is used. However, a feature of the present embodiment is that in FIG. 6b, the frequency with which the three switching elements are used is uniform, which is different from FIG. 6c.

In this way, by making the frequency with which the three switching elements are used uniform, it is possible to solve the problem of a difference in motor driving power of each of the plurality of coils arising from the physical arrangement position of the plurality of coils which are arranged within the motor being different between the plurality of coils.

Figure 7:
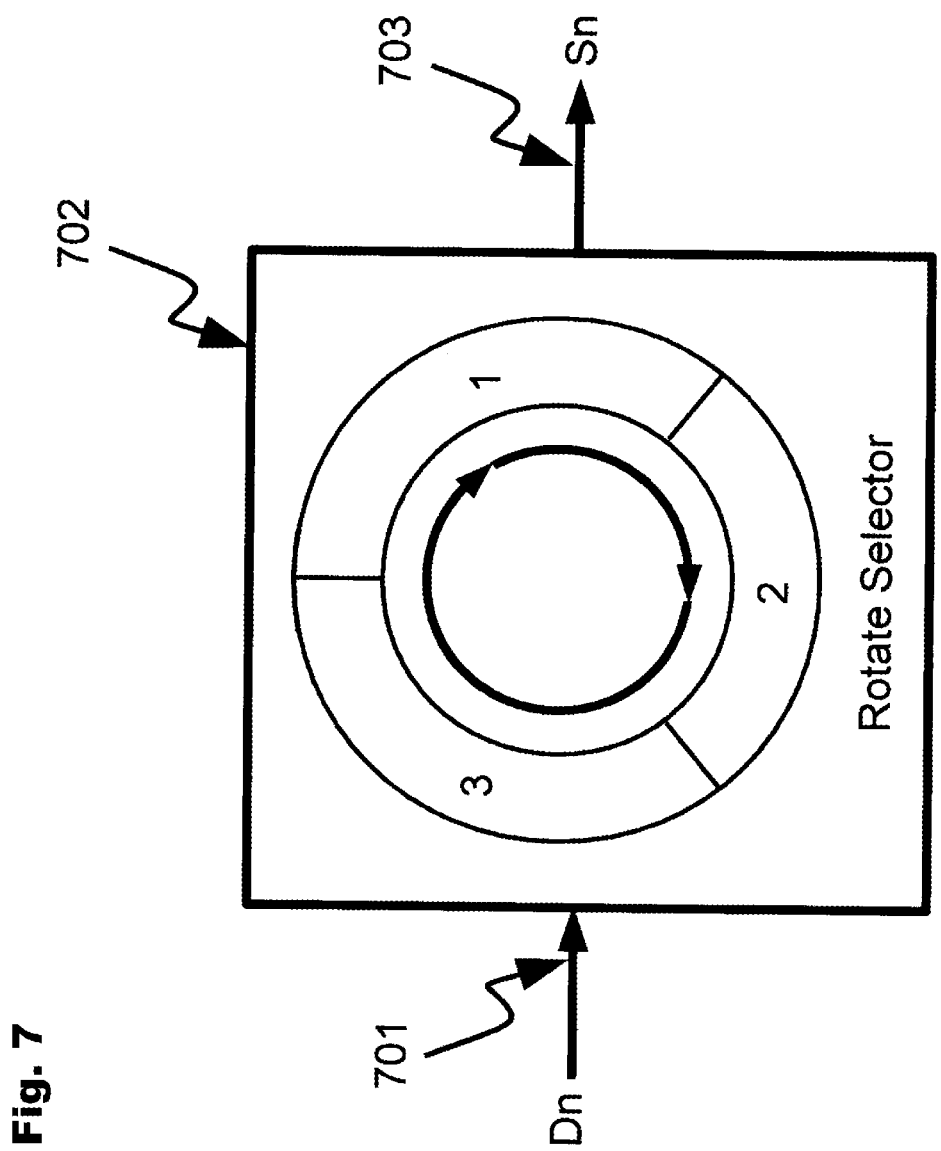
FIG. 7 is a circuit diagram of signal selection filter of a motor system related to one embodiment of the present invention.

A diagram of a signal selection filter circuit of the motor system related to the present embodiment is shown in FIG. 7. A plurality of PDM signals (701) generated from the multi-level delta-sigma modulation circuit is input to the signal selection filter circuit (702) and a plurality of filtered PDM signals (703) is generated. In the present embodiment, a rotary selection circuit is used as the signal selection filter circuit. The rotary selection circuit operates as a signal selection filter by selecting the plurality of PDM signals (703) which are outputs, so that the switching elements are used in sequence based on the data of the plurality of PDM signals (701) which are input.

Figure 8:
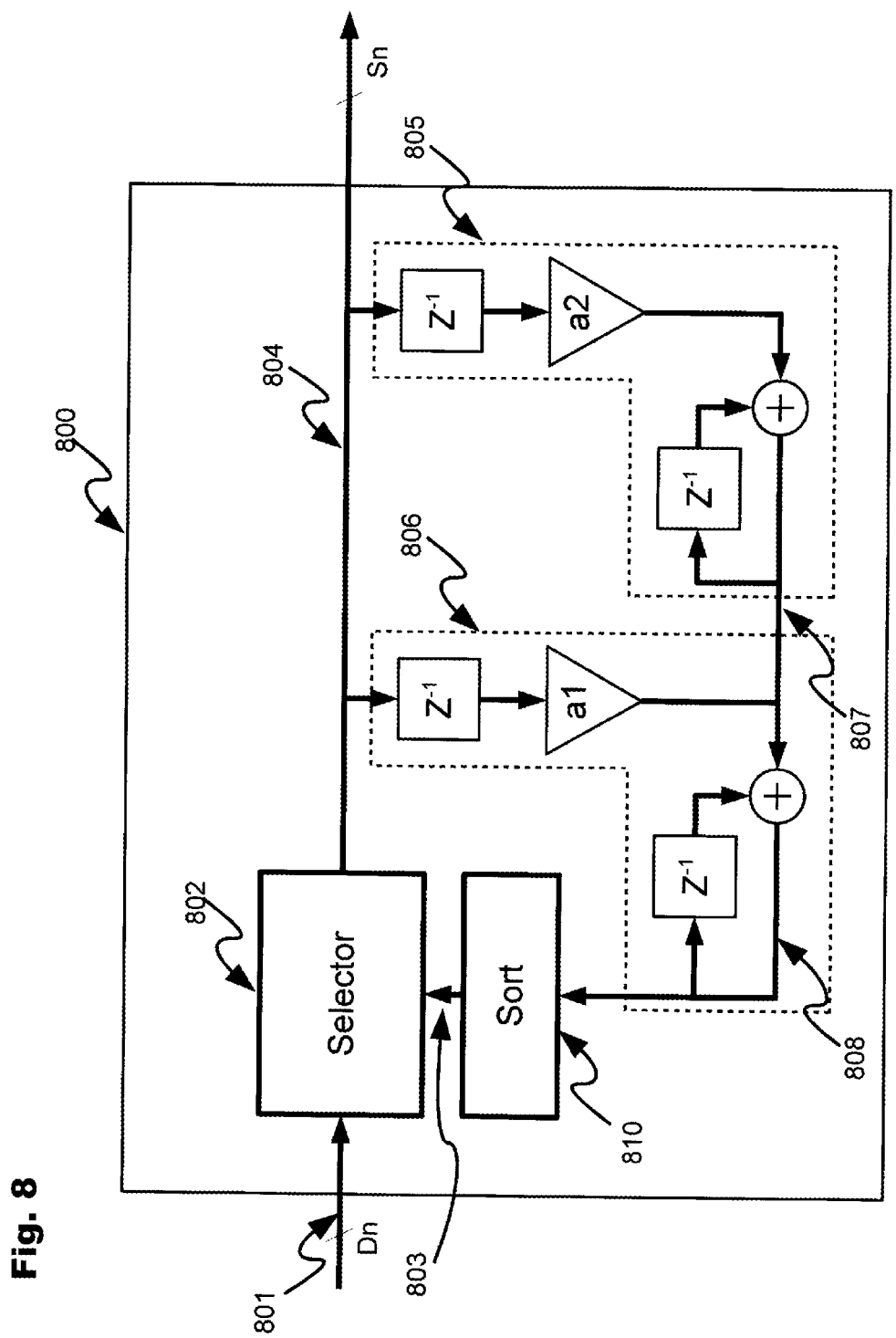
FIG. 8 is a circuit diagram of signal selection filter of a motor system related to one embodiment of the present invention.

The structural components of a signal selection filter circuit (800) constituting the motor system related to the present embodiment are shown in FIG. 8. The outputs (807, 808) of an integrated circuit (805) formed by a delay element and an addition device within the filter circuit and an integrated circuit (806) are input to a sort circuit (810), the usage frequency is calculated by a selection circuit (802) using an output signal (803) of the sort circuit (810), and a plurality of PDM plurality signals (801) generated from a delta-sigma modulation circuit is output as a plurality of PDM signals (804) after selection is controlled so that the frequency with which an element is selected becomes uniform.

Although a structure wherein the integrated circuits are used in two stages is shown in the signal selection filter circuit forming the motor system related to the present embodiment, the signal selection filter circuit can be configured by one or more optional integrating circuit stages.

Other Embodiments

In the first embodiment and second embodiment of the present invention, although an example of an inverter circuit for a general three-phase motor is shown, the effects of the present invention are also effective with respect to a motor including an arbitrary number of phases and any number of a plurality of coils. In addition, although an embodiment using a delta-sigma modulation circuit as a pulse density modulation circuit in order to simplify explanation is illustrated, it is possible to use an oversampling type modulator instead of the delta-sigma modulation circuit. Since it is possible to obtain a high driving power using a low voltage, the method for driving a motor by providing a plurality of PDM signals to a plurality of coils is effective in an application to a motor for an electric vehicle. It is possible to realize an inverter circuit for high efficiency, small scale electric vehicles by utilizing the inverter circuit related to one embodiment of the present invention.

In the first and second embodiments of the present invention, although an example of an inverter circuit for a general three-phase motor with no feedback control is illustrated, the effects of the present invention are also effective with respect to measuring the rotation angle etc. of a motor and feeding back the control of the motor. Since it is possible to obtain a high driving power using a low voltage, the method for driving a motor by providing a plurality of PDM signals to a plurality of coils is effective in an application to a motor for an electric vehicle. It is possible to realize an inverter circuit for high efficiency, small scale electric vehicles by utilizing the inverter circuit related to one embodiment of the present invention.

In the previous explanation hereto of the embodiments of the present invention, although an example of an inverter circuit for a general three-phase motor is illustrated, the effects of the present invention are not limited to an induction motor and can also be applied to direct current brushless motor.

According to the present invention, it is possible to reduce the current required for driving a motor per switching element while reducing a switching voltage by creating a signal using a plurality of PDM (pulse density modulation) from an input sine-wave signal using a pulse density modulator having a multi-level output, and controlling a plurality of switching elements using the plurality of PDM signals. It is possible to control an increase in the current consumed by a switching element itself by independently switching elements using a plurality of PDM signals (pulse density modulation) even when it is necessary to increase the capacitance of the switching element (number of switching elements) in order to secure the amount of current required for driving a motor. Therefore, it is possible to achieve a small scale and high efficiency inverter circuit for driving a motor.

According to the present invention, it is possible to reduce a switching voltage per switching element by controlling the plurality of switching elements using a plurality of PDM signals (pulse density modulated) obtained from an input sine wave signal using a pulse density modulator having a multi-level output. Therefore, because it becomes possible to use a switching element with a small gate capacitance owing to a reduction in the resistance required for a switching element, it becomes possible to increase the speed of the switching time and the efficiency of the inverter circuit.

Since the current flowing through the switching element is controlled by the ratio of the ON/OFF of the PDM signal and the number of switching elements which are simultaneously switched ON, if the required current amount is small, a PDM signal transition is no longer necessary and efficiency is not lost since it is possible to control the current consumed by switching element itself.

In addition, it is possible to control the current per switching element required for driving a motor since the current is controlled in parallel by a plurality of switching elements. Therefore, it becomes possible to reduce the switching voltage. Since it is possible to use a switching element with a low resistance and low ON voltage by reducing the switching voltage, it is possible to reduce costs while promoting a small scale and high efficiency inverter circuit for driving a motor.

What is claimed is:

1. An operating method of an inverter generating a plurality of alternating signals to be supplied to a motor, the motor including a plurality of phases and a plurality of coils arranged at each of the plurality of phases, the method comprising:
    modulating a signal that fluctuates periodically and controls rotation of the motor by a pulse-density modulator and generating an output signal; and
    selecting each of a plurality of switching elements so as to uniform a selected frequency of each of the plurality of switching elements according to the output signal and generating each of the plurality of alternating signals and controlling an ON/OFF of a direct current.

2. An inverter for generating a plurality of alternating signals to be supplied to a motor, the motor having a plurality of phases and a plurality of coils arranged at each of the plurality of phases, the inverter comprising:
    a multi-level pulse-density modulator configured to modulate a signal that fluctuates periodically and controls rotation of the motor;
    a plurality of switching elements configured to generate each of the plurality of alternating signals by controlling an ON/OFF of a direct current according to selection by an output signal of the pulse-density modulator; and a filter circuit configured to uniform the selection frequency of each of the plurality of switching elements, the filter circuit being input with the output signal of the pulse-density modulator, each of the plurality of switching elements generating each alternating signal supplied to each coil at each of the plurality of phases, each of the plurality of switching elements being selected by the output signal of the pulse-density modulator.

3. The inverter for driving a motor according to claim 2 wherein the filter circuit is a circuit for selecting in sequence an output signal according to the output signal of the pulse-density modulator which is input.

4. The inverter for driving a motor according to claim 2 wherein the filter circuit includes an integration circuit being input with the output signal of the pulse-density modulator and a sort circuit configured to uniform the selection frequency of each of the plurality of switching elements, each of the plurality of switching elements being selected by an output signal of the integration circuit.

5. The inverter for driving a motor according to claim 2 wherein the pulse-density modulator is formed by a delta sigma modulator.

6. The inverter for driving a motor according to claim 2 wherein the pulse-density modulator is formed by an oversampling type modulator.

* * * * *